United States Patent
Guan et al.

(10) Patent No.: US 12,444,056 B2
(45) Date of Patent: Oct. 14, 2025

(54) STRIP DECODER AND INSIDE-OUTSIDE LOSS FOR HIGH QUALITY IMAGE SEGMENTATION

(71) Applicant: Black Sesame Technologies Inc., San Jose, CA (US)

(72) Inventors: Xibeijia Guan, Singapore (SG); Tiecheng Wu, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 430 days.

(21) Appl. No.: 17/978,430

(22) Filed: Nov. 1, 2022

(65) Prior Publication Data

US 2024/0153099 A1     May 9, 2024

(51) Int. Cl.
    *G06T 7/194*     (2017.01)
    *G06V 10/25*     (2022.01)
    *G06V 10/26*     (2022.01)

(52) U.S. Cl.
    CPC ............. *G06T 7/194* (2017.01); *G06V 10/25* (2022.01); *G06V 10/267* (2022.01); *G06T 2207/20132* (2013.01)

(58) Field of Classification Search
    CPC ..... G06T 9/00; G06T 5/60; G06T 7/11; G06T 7/194; G06T 5/94; G06T 2207/20132; G06T 5/00; G06V 10/25; G06V 10/267
    See application file for complete search history.

(56) References Cited

U.S. PATENT DOCUMENTS

| 10,679,351 | B2 * | 6/2020 | El-Khamy | ........ G06F 18/24143 |
| 2022/0005200 | A1 * | 1/2022 | Chen | .......................... G06T 7/12 |

FOREIGN PATENT DOCUMENTS

| CN | 114998037 A | * | 9/2022 |
| WO | WO-2022175924 A1 | * | 8/2022 | ........... A61B 5/7267 |

OTHER PUBLICATIONS

Meng, Fanman, et al. "A new deep segmentation quality assessment network for refining bounding box based segmentation." IEEE Access 7 (2019): 59514-59523. (Year: 2019).*

Wang, Changwei, et al. "DA-Net: Dual branch transformer and adaptive strip upsampling for retinal vessels segmentation." International Conference on Medical Image Computing and Computer-Assisted Intervention. Cham: Springer Nature Switzerland, Sep. 16, 2022. (Year: 2022).*

Sun, Jiahao, and Jie Jiang. "Multi-kernel Fusion Pooling and Linear Convolution Kernel for Retinal Image Segmentation." 2022 IEEE 2nd International Conference on Power, Electronics and Computer Applications (ICPECA). IEEE, 2022. (Year: 2022).*

(Continued)

*Primary Examiner* — Henok Shiferaw
*Assistant Examiner* — Toluwani Mary-Jane Ijaseun
(74) *Attorney, Agent, or Firm* — Timothy T. Wang; Ni, Wang & Massand, PLLC

(57) ABSTRACT

The invention discloses a system for image segmentation for detecting an object. More particularly, the system performs two-stage segmentation on the object in the image to generate an enhanced image. The first stage is the object detection, followed by a second stage including segmentation. The invention segments the object from a background of the image to create an enhanced image.

10 Claims, 9 Drawing Sheets

(56) References Cited

OTHER PUBLICATIONS

Hou, Qibin, et al. "Strip pooling: Rethinking spatial pooling for scene parsing." Proceedings of the IEEE/CVF conference on computer vision and pattern recognition. 2020. (Year: 2020).*

Lin, Tsung-Yi, et al. "Focal loss for dense object detection." Proceedings of the IEEE international conference on computer vision. 2017. (Year: 2017).*

Zhang, Xixin, et al. "An improved encoder-decoder network based on strip pool method applied to segmentation of farmland vacancy field." Entropy 23.4 (2021): 435. (Year: 2021).*

Dai, Jifeng, Kaiming He, and Jian Sun. "Boxsup: Exploiting bounding boxes to supervise convolutional networks for semantic segmentation." Proceedings of the IEEE international conference on computer vision. 2015. (Year: 2015).*

Ma, Tianqi, et al. "Delving deeper into pixel prior for box-supervised semantic segmentation." IEEE Transactions on Image Processing 31 (Jan. 2022): 1406-1417 (Year: 2022).*

Uhrig, Jonas, et al. "Box2pix: Single-shot instance segmentation by assigning pixels to object boxes." 2018 IEEE Intelligent Vehicles Symposium (IV). IEEE, 2018 (Year: 2018).*

Cao, Jiale, et al. "SipMaskv2: Enhanced fast image and video instance segmentation." IEEE Transactions on Pattern Analysis and Machine Intelligence 45.3 (Jun. 2022): 3798-3812 (Year: 2022).*

Du, Xin-Feng, Jie-Sheng Wang, and Wei-zhen Sun. "UNet retinal blood vessel segmentation algorithm based on improved pyramid pooling method and attention mechanism." Physics in Medicine & Biology 66.17 (2021): 175013 (Year: 2021).*

Qibin Hou, Zhang Li, Ming-Ming Cheng, and Jiashi Feng. Strip Pooling: Rethinking Spatial Pooling for Scene Parsing. https://arxiv.org/pdf/2003.13328.pdf.

* cited by examiner

STRIP DECODER AND INSIDE-OUTSIDE LOSS FOR HIGH QUALITY IMAGE SEGMENTATION

FIELD OF INVENTION

The present invention relates to the field of machine learning image segmentation. Specifically, the invention further relates to a system including a strip decoder and an inside-outside loss module for high quality image segmentation.

BACKGROUND OF THE INVENTION

In a traditional object detection task, localization loss (L2/L1 loss) is commonly used to measure the difference between predicted value and ground truth value. However, due to the symmetric property of L2/L1 loss, an expanded bounding box or a shrunk bounding box can result in the same L2/L1 loss value.

However, at the application level, an expanded bounding box is preferred to a shrunk bounding box. This is especially true when the object inside the bounding box will be cropped and used for another task, such as segmentation.

A shrunk bounding box will lead to an incomplete representation of the object, which will cause segmentation fault. For example, an incomplete bounding box in the first stage may cut off some object body part, e.g., hands, in the resulting segmentation. An expanded bounding box will cause the segmentation process to focus on the background and to generate a low-resolution mask.

Moreover, traditional decoder structure using max pooling followed by a perceptron structure is not able to capture long range dependencies. To solve this deficiency, the present invention introduces a strip decoder, which takes the average values of the features along horizontal, vertical, 45 degree and −45 degree directions. This long kernel shape is able to capture long range dependencies with local details.

Therefore, on one hand, an expanded bounding box is preferable, and it should be assigned with a lower loss value. On the other hand, a strip decoder predicts a more accurate bounding box by using more global information in different directions.

A research paper entitled, *Strip Pooling: Rethinking Spatial Pooling for Scene Parsing*, by Qibin Hou, discloses strip pooling. Hou specifically discloses a spatial pooling architecture design that introduces a new strip pooling module that enables backbone networks to efficiently model long-range dependencies. The architecture presents a novel building block with diverse spatial pooling as a core. Also, Hou systematically compares the performances of the proposed strip pooling and conventional spatial pooling techniques.

Spatial pooling has been proven highly effective in capturing long-range contextual information for pixel-wise prediction tasks, such as scene parsing. The prior art beyond conventional spatial pooling usually has a regular shape of N×N and improvises the formulation of spatial pooling by introducing a new pooling strategy, called strip pooling, which considers a long but narrow kernel.

Although such prior art references focus on strip pooling and provide an improved segmentation method, the references fail to disclose a system for image segmentation with an architecture that provides an expanded but still accurate result of a bounding box prediction, along with the introduction of inside and outside loss to reduce the probability of misclassifying background noise as the target object.

Therefore, to overcome the deficiencies of the prior art, there is a current need to provide such a system for image segmentation. Moreover, such a system includes use of ROI detection followed by image segmentation to improve the segmentation result.

It is apparent now that numerous methods and systems developed in the prior art are adequate for limited purposes. Furthermore, even though these inventions may be suitable for the specific purposes to which they address, accordingly, they are not suitable for the purposes of the present invention as heretofore described. Thus, there is a need to provide a system including a strip decoder and an inside-outside loss module for high quality image segmentation.

SUMMARY OF THE INVENTION

Object detection has extensive functions in computer vision applications. For example, in autonomous driving applications, pedestrian and vehicle detection is crucial to accurately guide the movement of the automobile. In camera applications, photograph object detection is utilized to guide object segmentation according to the editing preferences of the user. In the ideal case, the predicted bounding box, which is a point set (S) in N dimensions, would be a minimum-perimeter bounding box; meaning the geometric measures, including area and volume, reach their smallest values. However, it can be difficult to predict an ideal bounding box in real-world environments. In most cases, a bounding box either larger or smaller than a minimum-perimeter bounding box is predicted, and such cases may cause problems. For example, in autonomous driving, if the predicted bounding box of a pedestrian is too small, the car may make an incorrect movement decision and hit the pedestrian. On the other hand, if the bounding box of the pedestrian is too large, the car may drive slower than needed.

For two-stage segmentation methods, the present invention detects a region of interest (ROI) to be used as a guide. If the first-stage ROI bounding box is too large, the second-stage input will have lower resolution, which means the second stage is not able to capture many details of the object. This will lead to a rough boundary of the segmentation mask. On the other hand, if the bounding box is too small, part of the object will not be visible in the following segmentation stage. Such a missing part is not recoverable and will lead to an incomplete segmentation mask.

A larger bounding box is preferable to a smaller bounding box, because it is better to overestimate than to underestimate the size of a target object. A slightly expanded bounding box will increase the robustness of the object detection model. However, most of the bounding-box-loss-handling methods treats larger and smaller bounding boxes equally.

The primary objective of the present invention is to provide a system for high quality segmentation, wherein the system includes an objective detector and a segmentation unit.

The object detector detects an object in an image. A decoder module is a strip pooling decoder which utilizes a long kernel shape in different directions to capture long range dependencies and a plurality of local details in the processed image to improve the accuracy of the object detection and to form a first processed image. An inside-outside loss module calculates an inside-outside loss of the object to clearly separate the object from the background of the first processed image and produces a second processed image.

The segmentation unit performs high-quality segmentation of the object detected from the background of the second processed image.

The other objective of the present invention is to facilitate a wide application of object detection in real life scenarios, such as autonomous driving, pedestrian and vehicle detection, and in camera applications.

The inside-outside loss is introduced to reduce the probability of misclassifying background noise as the target object.

In the present invention, the different directions include a horizontal direction, a vertical direction, a 45 degrees and a −45 degrees directions. The 45 and −45 degree pooling decoders are able to detect tilt object.

In the present invention, the inside-outside loss is calculated through the recall ratio. The inside-outside loss determines the recall of the object and measures a number of background pixels correctly detected as background.

In the present invention, the strip pooling decoder is designed to increase the accuracy of the bounding box prediction by increasing receptive field along different directions.

In the present invention, the inside-outside loss is introduced to the objects detected to increase the accuracy of the object ROI detection. The high accuracy detection offers decent ROI to improve segmentation result.

In the present invention, the strip decoder and the inside-outside loss unit are introduced to improve the accuracy of image segmentation. The stripe pooling decoder utilizes a long kernel shape in different directions to capture long range dependencies. The long kernel shape focuses on the local details in the image to improve the accuracy of the object detection by the strip pooling decoder.

Thereafter, the inside and outside losses are introduced to reduce the probability of misclassification of background noise as the target object. The invention uses a two-stage segmentation method deploying ROI detection followed by image segmentation to improve the segmentation result.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

BRIEF DESCRIPTION OF THE INVENTION

The objects and features of the present invention will become more fully apparent from the following description and appended claims, taken in conjunction with the accompanying drawings. Understanding that these drawings depict only typical embodiments of the invention and are, therefore, not to be considered limiting of its scope. The invention will be described and explained with additional specificity and detail through the use of the accompanying drawings.

DETAILED DESCRIPTION OF THE INVENTION

Figure 1:
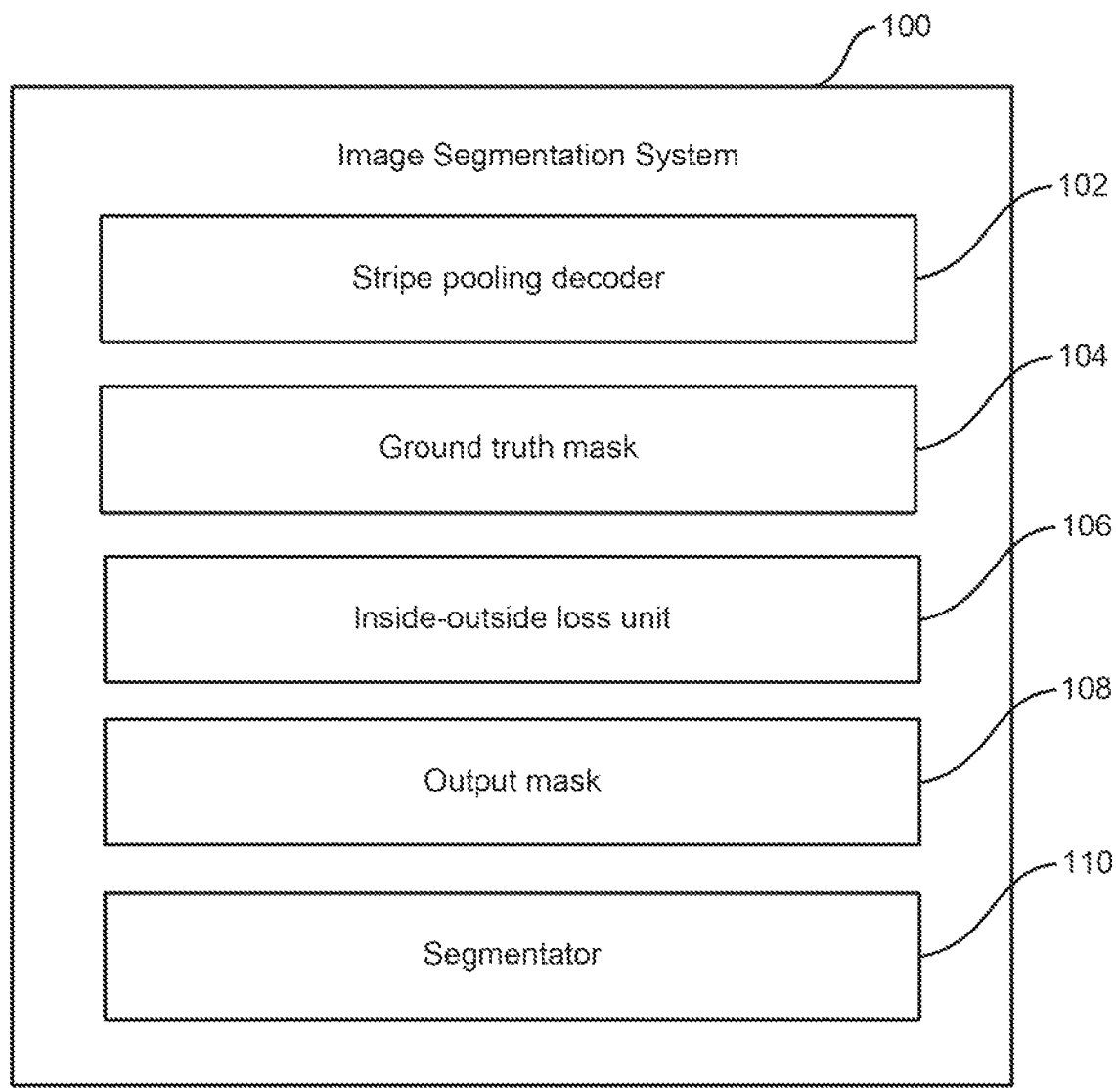
FIG. 1 illustrates a system for high-quality segmentation of an image in accordance with the present invention.

FIG. 1 illustrates a system for high-quality image segmentation. The system 100 includes an object detector and a segmentation unit. The object detector detects an object in the image. Further, the object detector is a strip pooling decoder 102.

The strip pooling decoder decodes the image by covering a larger portion of the processed image in a number of directions. Also, the strip pooling decoder defines a boundary around the object to be separated from the background portion of the image. Moreover, the number of directions includes a horizontal direction, a vertical direction, a 45 degrees and a −45 degrees directions. The 45 degree and −45 degree pooling decoders are able to detect tilt objects.

A ground truth mask 104 is a reference mask marked around the bounding box covering the background. The strip decoder 102 takes the maximum values of the features along the different directions. The long kernel shape is able to capture long range dependencies and local details which results in better prediction accuracy.

The boundary around the object is a minimum-perimeter bounding box. The strip pooling decoder is designed to increase the accuracy of the bounding box prediction by increasing a receptive field along different directions.

The inside-outside loss unit 106 calculates an inside-outside loss in the object to separate the object from the background portion of the image to generate a processed image. Further, the inside-outside loss is calculated through the recall ratio. Recall is defined as:

$$\frac{tp}{tp + fn}$$

Where tp is a true positive value and fn is a false negative value. Recall in this context can also be referred to as the true positive rate or sensitivity.

Similarly, a precision ratio is defined as:

$$\frac{tp}{tp+fp}$$

Where tp is a true positive value and fp is a false positive value. Precision in this context can also be referred to as the positive predictive value. The recall and precision ratios are generally known to one skilled in the art of machine learning classification tasks.

The inside-outside loss is introduced to reduce the probability of misclassification of the background portion as the target object. The inside-outside loss is calculated through the recall ratio. The inside-outside loss unit utilizes the recall ratio of the object and measures a number of background portion pixels correctly detected as background noise.

An output mask 108 is marked in accordance with the inside-outside loss calculated. The image is converted into the combination of a masked background and an unmasked object.

The segmentation unit 110 performs high-quality segmentation of the object around the boundary by cropping the object from the background portion of the image.

The inside-outside loss is introduced to the objects detected to increase the accuracy of the object ROI detection. The high-accuracy detection offers decent ROI to improve the segmentation result.

The object detection technique is widely applied to real life computer vision applications, which include autonomous driving, pedestrian and vehicle detection, and various camera applications.

In image segmentation, the misclassification of background pixels as part of the target object or misclassification of some target object pixels as the background are undesirable. Between these two cases, misclassification of target object pixel as background on the boundary has less impact on the final segmentation result. However, traditional losses, e.g. binary cross-entropy loss, does not have a preference between these two cases. Therefore, the present invention introduces the inside-outside loss as formulated in equation (1), which considers the difference between these two cases.

Figure 2:
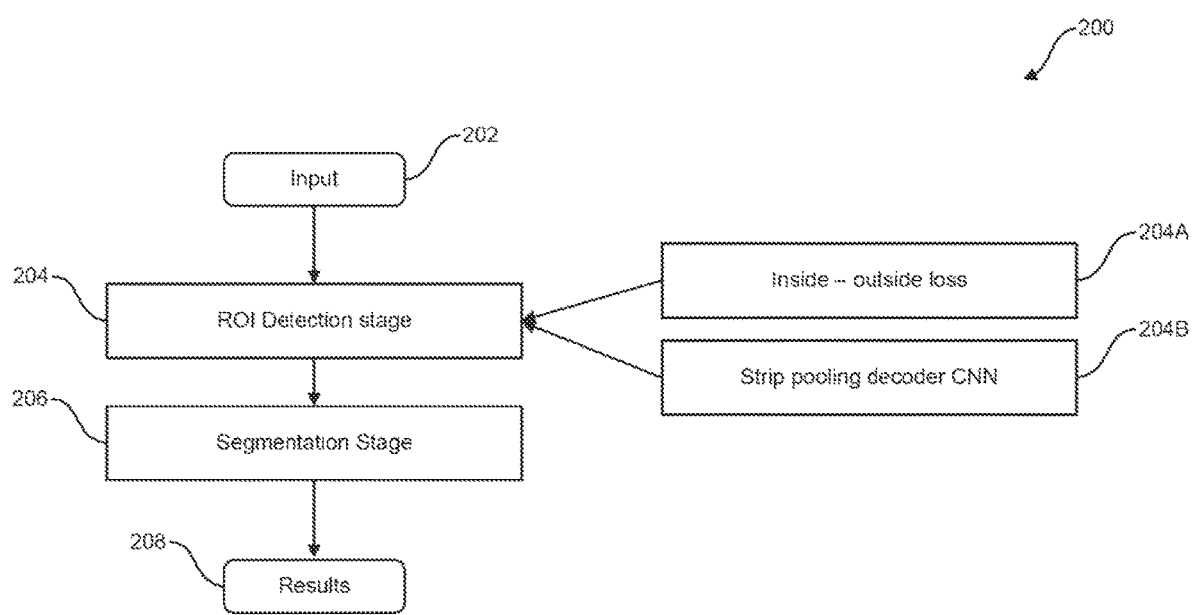
FIG. 2 illustrates a flow chart of a two-stage region of interest (ROI) segmentation system in accordance with the present invention.

FIG. 2 illustrates a flow chart of a two-stage ROI segmentation system 200. The process of defining an input frame 202 is ROI segmentation. A two stage ROI segmentation solution is proposed for high quality segmentation. The two stages are an object detection stage and an object segmentation stage. The object detection stage is the ROI detection stage 204 where the inside-outside loss 204A differentiates shrunk and expanded bounding box.

The strip decoder (horizontal, vertical, 45 and −45 degree) 204B captures long range dependencies of a long-range banded object. The detected object then moves to the next stage, i.e. the segmentation stage 206. In the segmentation stage 206 the masking of the image around the bounding box is performed with the help of a ground truth mask and an output mask and further with the help of calculating an inside-outside loss to provide high quality segmentation as the result 208.

Figure 3:
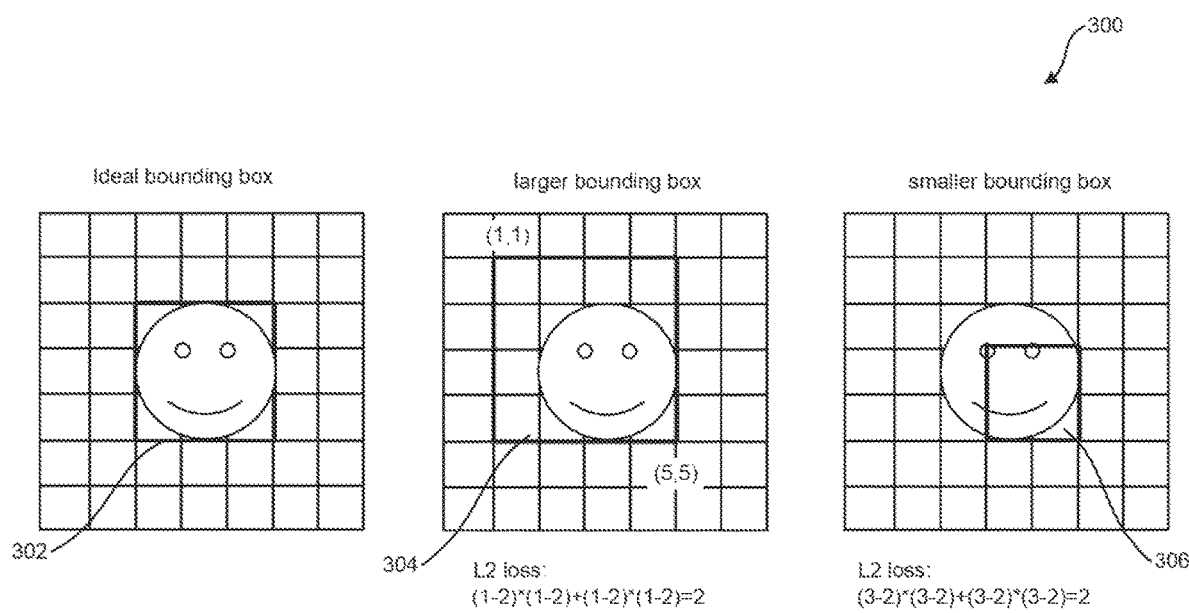
FIG. 3 illustrates a comparison of a larger bounding box against a smaller bounding box predicted in the image in accordance with the present invention.

FIG. 3 illustrates a larger bounding box in comparison with a smaller bounding box 300 as predicted in the image. For two-stage segmentation, the system detects a ROI to guide the segmentation by predicting an ideal bounding box 302. If the first-stage ROI bounding box is too large, the second-stage input will have lower resolution, which means the second stage is not able to capture many details of the object. This will lead to a rough boundary of the segmentation mask.

If the bounding box is too small 306, part of the object will not be visible in the following segmentation stage. The missing part is not recoverable and will lead to an incomplete segmentation mask. A larger bounding box is preferable over a smaller bounding box because it is better to overestimate than to underestimate the object size in many scenarios. A slightly expanded bounding box will increase the robustness of the object detection model.

However, most of the bounding-box-loss-handling methods treat larger and smaller bounding boxes equally. For example, the L2 loss method, which is widely used in object detection because of its similarity property, treat the losses in bigger and smaller bounding boxes in the same way. FIG. 3 shows such a case where the L2 loss of larger bounding box 304 and that of smaller bounding box 306 are the same.

Figure 4:
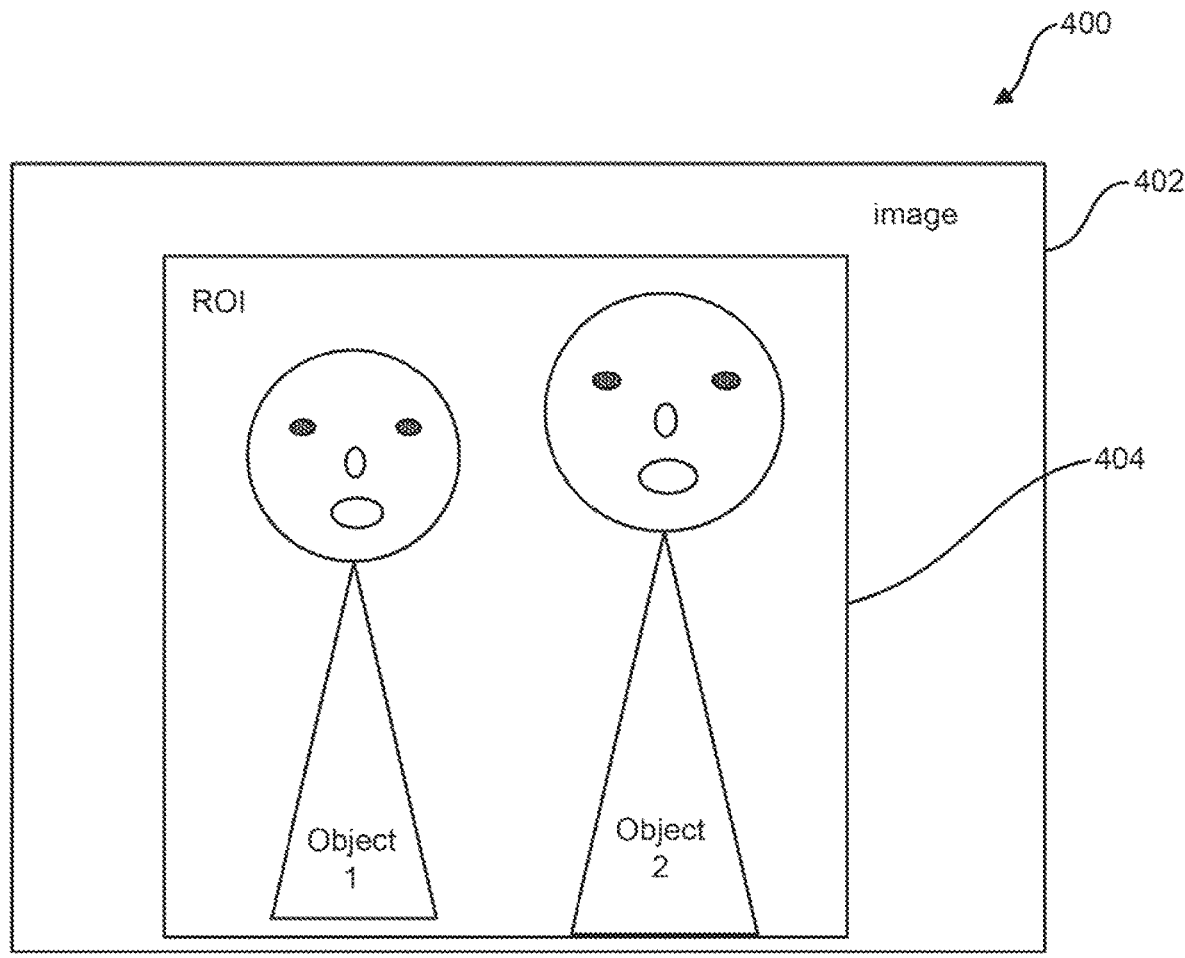
FIG. 4 illustrates an image plane and the ROI detected by an object detector in the system in accordance with the present invention.

FIG. 4 illustrates an image plane and ROI detected by an object detector in the system. The system 400 introduces an inside-outside loss in the image 402 to lead detection results to be expanded. The system increases the accuracy of the object ROI detection 404, such as objects 1 & 2, as shown as FIG. 4.

FIG. 3 illustrates an ideal minimum-perimeter bounding box 302, a larger bounding box 304, and a smaller bounding box 306. The larger bounding box loss is (1−2)*(1−2)+(1−2)*(1−2)=2 and the smaller bounding box loss is (3−2)*(3−2)+(3−2)*(3−2)=2. Further, high-accuracy detection offers decent ROI to improve segmentation result overcoming all the losses.

Figure 5:
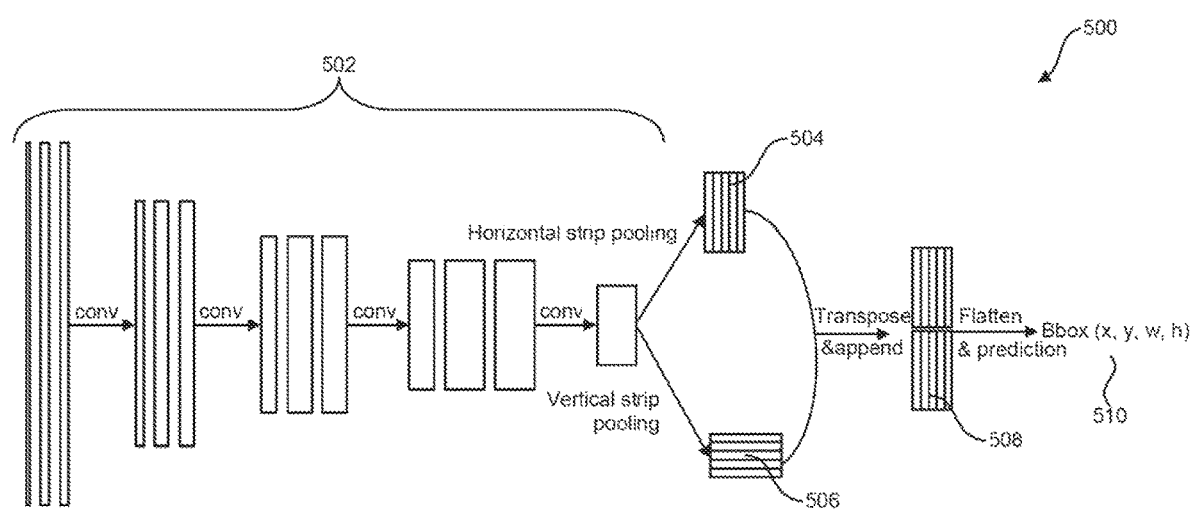
FIG. 5 illustrates a strip pooling decoder based object detection in accordance with the present invention.

FIG. 5 illustrates a strip pooling decoder based object detection. Classical encoder-decoder neural network structure 500 employs a pyramid structure with interpolation or spatial pooling to increase and decrease the receptive field to get improved results. However, ROI detection needs long-range contextual information 502.

A strip pooling is designed to increase the accuracy of the bounding box prediction by increasing the receptive field along different directions. As shown as FIG. 5, the present invention utilizes four directions of strip pooling encoder and decoder CNN structure to improve the detection results.

The four directions horizontal 504, vertical 506, 45 degree and −45 degrees 508 are used to analyze and capture more area in the image and form a bounding box with a value of Bbox (x, y, w, h) 510.

Figure 6:
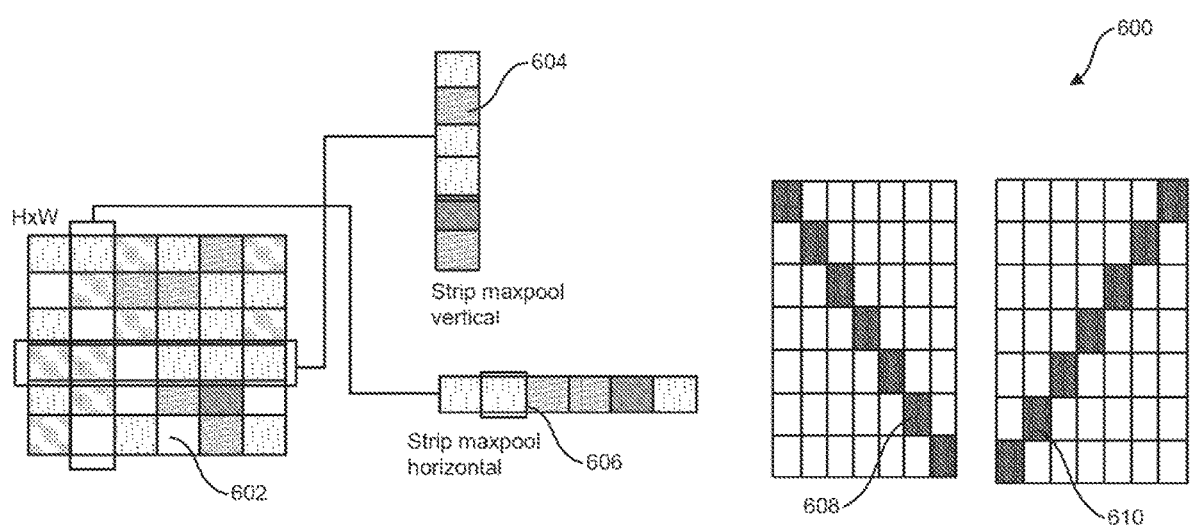
FIG. 6 illustrates a number of directions of the strip pooling decoder in accordance with the present invention.

FIG. 6 illustrates a number of directions of strip pooling. The strip pooling structure 600 works very well in segmentation task to segment an object with long range banded structure. The present invention utilizes a directional pooling structure 602 with horizontal 606, vertical 604, 45 degree 608 and −45 degree 610 to capture long range dependencies on four directions in object detection task. The 45 and −45 degree pooling structures are able to detect tilt object.

Traditional decoder structures utilize a MaxPooling method followed by a perceptron structure is not able to capture long range dependencies. The present invention introduces a trip decoder, which takes the max values of the features along horizontal, vertical, 45 degrees and −45 degrees directions. This long kernel shape is able to capture long range dependencies and local details which results in better prediction accuracy.

Figure 7:
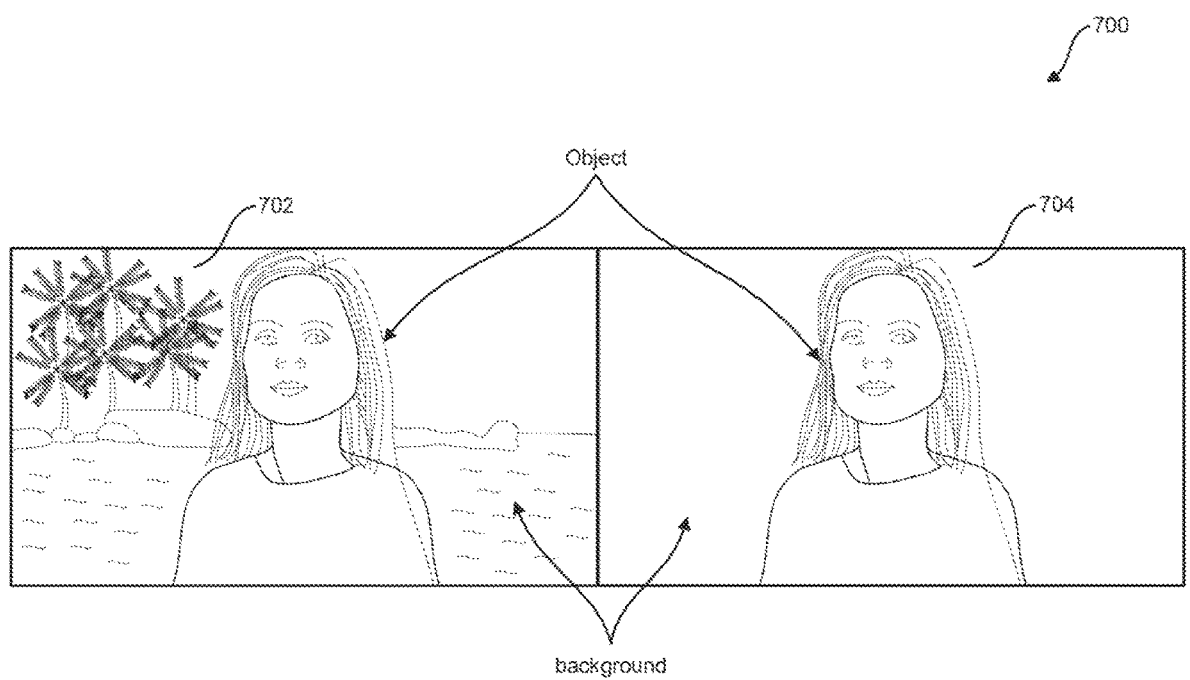
FIG. 7 illustrates an object separated from a background region after high-quality segmentation of the image in accordance with the present invention.

FIG. 7 illustrates target object and background noise separation after high quality segmentation of the image 700.

In image segmentation, the misclassification of the background pixel as target object or misclassification of target object pixel as background are undesirable. However, misclassification of target object pixel as background on the boundary has less impact on the final segmentation result.

Traditional losses, e.g., binary cross-entropy loss, do not have any preference between these two cases. Therefore, the present invention introduces the inside-outside loss formulated as equation (1), which considers the difference between these two cases. F2 is defined as the object recall ratio and F0.5 is defined as the background recall ratio. We use Fb loss as the basic loss, which is formulated as equation (2). The parameter n is used to adjust the weight between these two cases.

The loss is similar to standard dice index loss but introduces desired recall and precision ratios. A beta level refers to the probability of Type II error in a statistical hypothesis test, that is the probability of accepting the null hypothesis when it is false. Here, the larger the beta level, the more the loss focuses on the precision of the object, which means less background pixel in the object segmentation mask. The smaller the beta level, the more the loss focuses on the recall of the object 704. It measures how many background pixels are correctly detected as background and separates the object 704 from the image 702.

$$\text{Loss} = (1 - F_2) + (1 - F_{0.5}) \quad (1)$$

$$F_\beta = (1 + \beta^2) \left( \frac{\text{precision} * \text{recall}}{(\beta^2 * \text{precision}) + \text{recall}} \right) \quad (2)$$

Figure 8:
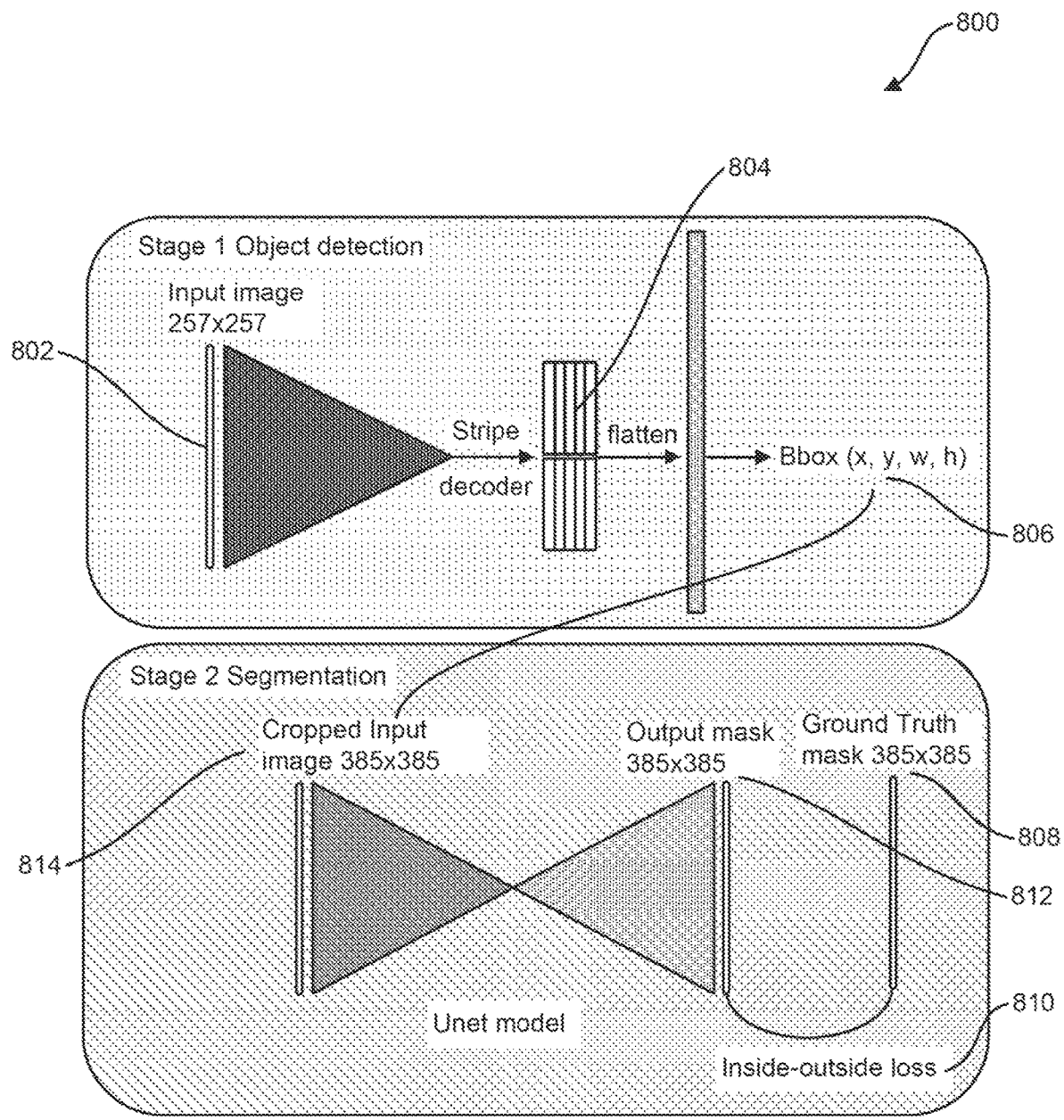
FIG. 8 illustrates a two-stage segmentation structure of the system in accordance with the present invention.

FIG. 8 illustrates a two-stage segmentation structure 800 of the system. The system includes a strip pooling decoder 804, a ground mask 808, an inside-outside loss unit 810, an output mask 812, and a segmentation unit 814. The system works in two stages: the first stage is an object detection stage where the object is detected by strip pooling decoder 804 from the input image 802.

The strip pooling decoder 804 decodes the image by covering a larger portion of the processed image in four directions. The strip pooling decoder 804 further predicts a bounding box 806 around the object to be separated from the background portion of the image. The bounding box 806 includes coordinates (x, y, w, h) which denote the vertical, horizontal, 45 degree and −45 degree directions.

The second stage includes a step in which a ground truth mask 808, a reference mask marked around the bounding box, covers the background. The inside-outside loss unit 810 calculates an inside-outside loss in the image to separate the object from the background of the image.

The output mask 812 is marked in accordance with the inside-outside loss previously calculated. Then, the image is converted into a masked background and an unmasked object.

The segmentation unit 814 performs high-quality segmentation of the unmasked object by cropping the unmasked object from the masked background to generate an enhanced image.

Figure 9:
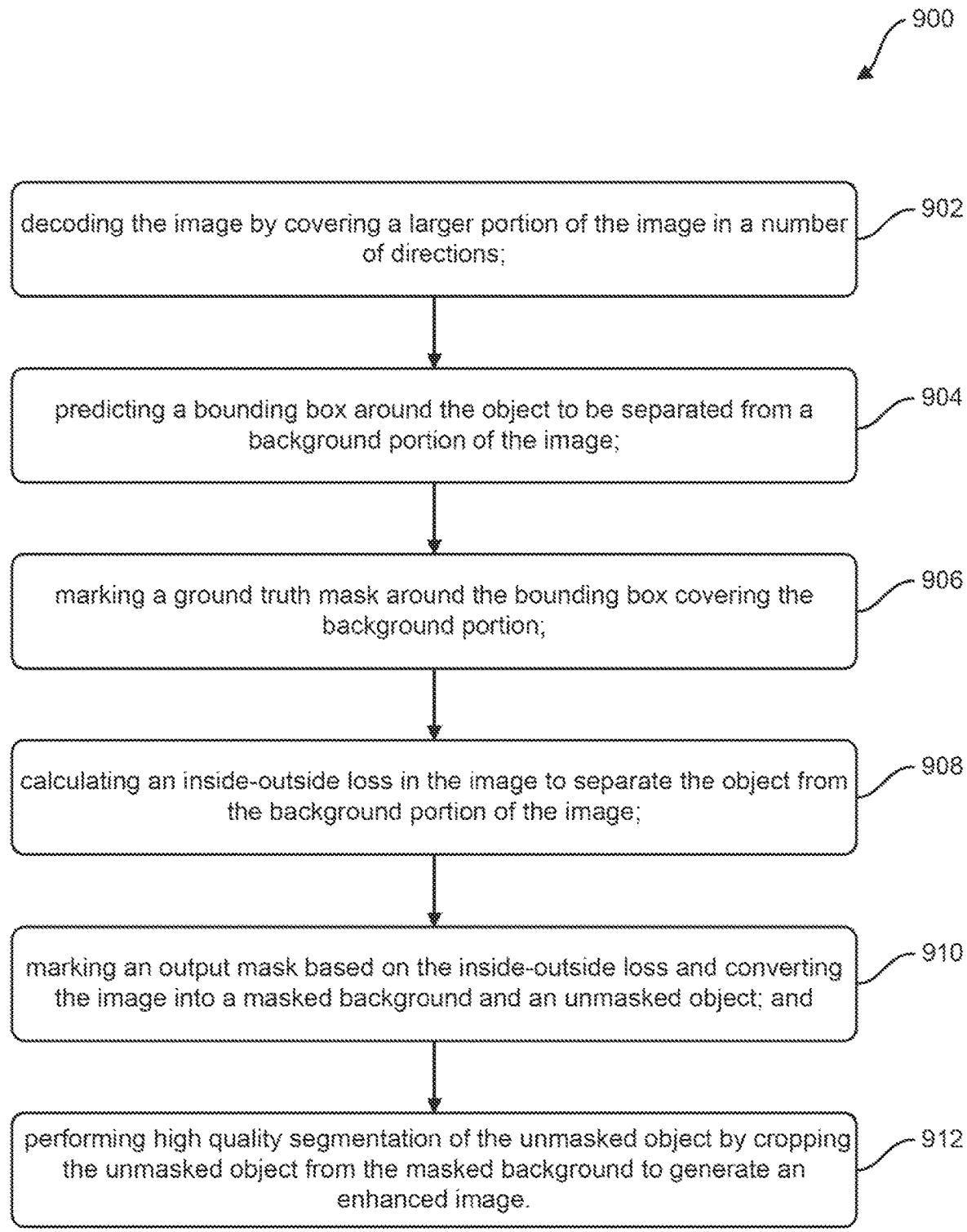
FIG. 9 illustrates a method for high-quality segmentation of the image in accordance with the present invention.

FIG. 9 illustrates a method for high-quality segmentation on an object in an image. The method 900 includes firstly decoding the image by covering a larger portion of the processed image in four directions with the help of the strip pooling decoder which decodes the image 902.

A bounding box is predicted around the object so that the object can be separated from the background portion of the image 904. The bounding box is an imaginary line drawn around the object for the purpose of masking.

Later, a ground truth mask is masked as a reference mask around the bounding box to cover the background 906. Further, an inside-outside loss unit calculates an inside-outside loss in the image to separate the object from the background of the image 908. Then, an output mask is marked according to the inside-outside loss calculated earlier 910. And the image is converted into a masked background and an unmasked object.

Finally, a segmentation unit performs high-quality segmentation of the unmasked object by cropping the unmasked object from the masked background to generate the enhanced image 912.

Although the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A system to generate an enhanced image, comprising:
   a strip pooling decoder, wherein the strip pooling decoder decodes an image by covering a larger portion of the image in a number of directions and predicts a bounding box around an object to be separated from a background of the image, wherein a ground truth mask is marked around the bounding box covering the background;
   an inside-outside loss unit, wherein the inside-outside loss unit calculates an inside-outside loss in the image to separate the object from the background of the image;
   an output mask, wherein the output mask is marked in accordance with the inside-outside loss calculated to convert the image into a masked background and an unmasked object;
   a segmentation unit, wherein the segmentation unit performs high quality segmentation of the unmasked object by cropping the unmasked object from the masked background to generate the enhanced image; and
   wherein the inside-outside loss is based on an object recall ratio and a background recall ratio.

2. The system of claim 1, wherein the inside-outside loss reduces a probability of misclassification of the background in the image as the object.

3. The system of claim 1, wherein the number of directions includes a horizontal direction, a vertical direction, a 45 degree direction, and a −45 degrees direction.

4. The system of claim 3, wherein a 45 degree direction and a −45 degree direction detect one or more tilt objects in the image.

5. The system of claim 1, wherein the inside-outside loss unit utilizes the object recall ratio and measures a number of background pixels detected as the background.

6. The system of claim 1, wherein a long kernel shape captures long range dependencies and local details within the image.

7. The system of claim 1, wherein the strip pooling decoder increases an accuracy of a bounding box prediction by increasing a receptive field along the number of directions.

8. A system for performing two stage segmentation on an object in an image to generate an enhanced image, comprising:
- a strip pooling decoder, wherein the strip pooling decoder decodes an image by covering a larger portion of a processed image in four directions and predicts a bounding box around the object to be separated from a background portion of the image, further wherein a number of directions includes a horizontal direction, a vertical direction, a 45 degrees and a −45 degrees directions;
- a ground truth mask, wherein a ground truth mask is marked around the bounding box covering a background;
- an inside-outside loss unit, wherein the inside-outside loss unit calculates an inside-outside loss in the image to separate the object from the background of the image, further wherein the inside-outside loss is calculated through a recall ratio;
- an output mask, wherein the output mask is marked in accordance with the inside-outside loss calculated and converts the image into a masked background and an unmasked object;
- a segmentation unit, wherein the segmentation unit performs high quality segmentation of the unmasked object by cropping the unmasked object from the masked background to generate the enhanced image; and
- wherein the inside-outside loss is based on an object recall ratio and a background recall ratio.

9. A method for high quality segmentation of an object in an image to generate an enhanced image, comprising:
- decoding the image by covering a larger portion of the image in a number of directions; predicting a bounding box around the object to be separated from a background portion of the image;
- marking a ground truth mask around the bounding box covering the background portion;
- calculating an inside-outside loss in the image to separate the object from the background portion, wherein the inside-outside loss is based on an object recall ratio and a background recall ratio;
- marking an output mask based on the inside-outside loss and converting the image into a masked background and an unmasked object; and
- performing high quality segmentation of the unmasked object by cropping the unmasked object from the masked background to generate the enhanced image.

10. A non-transitory computer program product comprising a computer useable medium having computer program logic for enabling at least one processor in a computer system for a system to perform high quality segmentation, said computer program logic comprising:
- decoding an image by covering a larger portion of the image in a number of directions; predicting a bounding box around an object to be separated from a background portion of the image; marking a ground truth mask around the bounding box covering the background portion;
- calculating an inside-outside loss in the image to separate the object from the background portion, wherein the inside-outside loss is based on an object recall ratio and a background recall ratio;
- marking an output mask based on the inside-outside loss and converting the image into a masked background and an unmasked object; and
- performing high quality segmentation of the unmasked object by cropping the unmasked object from the masked background to generate an enhanced image.

* * * * *